US010821676B2

(12) United States Patent
Sansare

(10) Patent No.: US 10,821,676 B2
(45) Date of Patent: Nov. 3, 2020

(54) METHOD FOR 3D PRINTING USING FUSION DEPOSITION MODELING WITH EXTRUSION TEMPERATURE CONTROL

(71) Applicant: Swapnil Sansare, Navi Mumbai (IN)

(72) Inventor: Swapnil Sansare, Navi Mumbai (IN)

(*) Notice: Subject to any disclaimer, the term of this patent is extended or adjusted under 35 U.S.C. 154(b) by 0 days.

(21) Appl. No.: 16/465,602

(22) PCT Filed: Sep. 22, 2017

(86) PCT No.: PCT/IB2017/055755
§ 371 (c)(1),
(2) Date: May 31, 2019

(87) PCT Pub. No.: WO2018/100444
PCT Pub. Date: Jun. 7, 2018

(65) Prior Publication Data
US 2019/0381737 A1    Dec. 19, 2019

(30) Foreign Application Priority Data

Dec. 1, 2016 (IN) .............................. 201621041043

(51) Int. Cl.
*B29C 64/393* (2017.01)
*B33Y 50/02* (2015.01)
(Continued)

(52) U.S. Cl.
CPC ............ *B29C 64/393* (2017.08); *B33Y 50/02* (2014.12); *G05B 19/4099* (2013.01); *B29K 2101/12* (2013.01); *G05B 2219/49023* (2013.01)

(58) Field of Classification Search
None
See application file for complete search history.

(56) References Cited

U.S. PATENT DOCUMENTS 5,121,329 A     6/1992  Crump
9,440,397 B1 *  9/2016  Fly ...................... B29C 64/106
(Continued)

FOREIGN PATENT DOCUMENTS

WO   WO 2016/124432    8/2016
WO   WO 2018/100444    6/2018

OTHER PUBLICATIONS

Kaveh et al. 'Optimization of the printing parameters affecting dimensional accuracy and internal cavity for HIPS material used in fused deposition modeling processes' Journal of Materials Processing Technology 226 (2015) 280-286.*

(Continued)

*Primary Examiner* — Bernard G Lindsay

(57) ABSTRACT

A system for 3D printing an object using fusion deposition modeling (FDM) that comprises a gcode file read module configured to receive a gcode file and read the contents thereof, a layer features and size recognition module configured to retrieve tool path length from the geode file, a temperature estimation and control module configured to receive the tool path length from the layer features and size recognition module and further configured to retrieve tool path default temperature of extruder from the gcode file, a material flow deposition estimation and control module configured to read tool path default flow rate of a material to be extruded and the tool path length from the gcode file, and an extrusion failure repair and control module configured to monitor consumption of the material in the 3D printing using FDM. The system controls any or a combination of flow of the material being extruded and temperature of the material being extruded based on geometry of a part of the object being produced.

1 Claim, 5 Drawing Sheets

(51) Int. Cl.
*G05B 19/4099* (2006.01)
*B29K 101/12* (2006.01)

(56) References Cited

U.S. PATENT DOCUMENTS

| | | | |
|---|---|---|---|
| 2012/0068378 A1* | 3/2012 | Swanson | B33Y 10/00 |
| | | | 264/308 |
| 2013/0009338 A1* | 1/2013 | Mayer | B33Y 30/00 |
| | | | 264/241 |
| 2013/0095302 A1 | 4/2013 | Pettis et al. | |
| 2015/0093465 A1 | 4/2015 | Page | |
| 2015/0307385 A1 | 10/2015 | Klein et al. | |
| 2016/0052208 A1 | 2/2016 | Debora et al. | |
| 2016/0075089 A1 | 3/2016 | Duro Royo et al. | |
| 2017/0151704 A1* | 6/2017 | Go | B29C 64/209 |
| 2018/0050495 A1* | 2/2018 | Stolyarov | C08J 5/041 |

OTHER PUBLICATIONS

Examination Report Under Sections 12 & 13 of the Patents Act, 1970 and the Patents Rules, 2003 dated Nov. 14, 2018 From the Government of India, Intellectual Property India, Patents, Designs, Trade Marks, Geographical Indications Re. Application No. 201621041043. (6 Pages).

International Search Report and the Written Opinion dated Dec. 4, 2018 From the International Searching Authority Re. Application No. PCT/IB2017/055755. (11 Pages).

* cited by examiner

METHOD FOR 3D PRINTING USING FUSION DEPOSITION MODELING WITH EXTRUSION TEMPERATURE CONTROL

RELATED APPLICATIONS

This application is a National Phase of PCT Patent Application No. PCT/IB2017/055755 having International filing date of Sep. 22, 2017, which claims the benefit of priority of Indian Patent Application No. 201621041043 filed on Dec. 1, 2016. The contents of the above applications are all incorporated by reference as if fully set forth herein in their entirety.

FIELD AND BACKGROUND OF THE INVENTION

The present disclosures relates to the field of 3D printing. More particularly, the present disclosures relates to fusion deposition modeling (FDM) and printers using FDM.

Background description includes information that may be useful in understanding the present invention. It is not an admission that any of the information provided herein is prior art or relevant to the presently claimed invention, or that any publication specifically or implicitly referenced is prior art.

3D printing, also known as additive manufacturing (AM), refers to processes used to synthesize a three-dimensional object in which successive layers of material are formed under computer control to create an object. Objects can be of almost any shape or geometry and are produced from digital model data 3D model or another electronic data source such as an Additive Manufacturing File (AMF) file.

Since early 1980s various people have been working on various aspects of AM which together now are generically termed as 3D printing. In 1984, Chuck Hull of 3D Systems Corporation developed a prototype system based on a process known as stereolithography, in which layers are added by curing photopolymers with ultraviolet lightlasers. Hull defined the process as a "system for generating three-dimensional objects by creating a cross-sectional pattern of the object to be formed," but this had been already invented. However, Hull developed a STL (STereoLithography) file format therein that is now widely accepted by 3D printing software as well as the digital slicing and infill strategies common to many processes today. The term 3D printing originally referred to a process employing standard and custom inkjet print heads. The technology used by most 3D printers to date is fused deposition modeling (FDM), a special application of plastic extrusion as is elaborated herein.

The process of 3D printing involves in the main three steps. Firstly, 3D modelling is done wherein 3D printable models may be created with a computer-aided design (CAD) package, via a 3D scanner, or by a plain digital camera and photogrammetry software. 3D printed models created with CAD result in reduced errors and can be corrected before printing, allowing verification in the design of the object before it is printed.

Next, the printable model is printed from an "STL" file created during the 3D modelling process. Since most CAD applications produce errors in output STL files, it must be first "repaired". Generally STLs that have been produced from a model obtained through 3D scanning often have more of these errors. This is due to how 3D scanning works—as it is often by point to point acquisition, reconstruction will include errors in most cases.

Next, the repaired STL file is processed by a piece of software called a "slicer" that converts the model into a series of thin layers and produces a "Gcode" file containing instructions tailored to a specific type of 3D printer (usually, FDM printers as elaborated hereunder). This gcode file can then be printed with 3D printing client software (which loads the gcode file that carries the various instructions to operate a corresponding 3D printer that is usually an FDM printer elaborated hereunder. These instructions can include, amongst others, layers to be printed, tool paths for each layer (such tool paths being derived from geometry of part to be produced), amount of material to be extruded at each region of the layer, speed and temperature of the extruder, turning on an off various coolants etc. Printer resolution describes layer thickness and X-Y resolution in dots per inch (dpi) or micrometers (μm). Typical layer thickness is around 100 μm (250 DPI), although some machines (printers) can print layers as thin as 16 μm (1,600 DPI). X-Y resolution is comparable to that of laser printers. The particles (3D dots) are around 50 to 100 μm (510 to 250 DPI) in diameter.

Traditional techniques like injection moulding can be less expensive for manufacturing polymer products in high quantities, but additive manufacturing can be faster, more flexible and less expensive when producing relatively small quantities of parts. 3D printers give designers and concept development teams the ability to produce parts and concept models using a desktop size printer. Seemingly paradoxically, more complex objects can be cheaper for 3D printing production than less complex objects.

Though the printer-produced resolution is sufficient for many applications, printing a slightly oversized version of the desired object in standard resolution and then removing material with a higher-resolution subtractive process can achieve greater precision. This is the final step of "finishing" that is sometimes required.

A very large majority of 3D printers called FDM printers use Fused Deposition Modeling (FDM), which derives from automatic polymeric foil hot air welding system, hot-melt gluing and automatic gasket deposition. The principle was commercialized in 1990s by Stratasys and after their patent on the technology expired, a large open-source development community has developed and presently both commercial and DIY variants utilizing this type of 3D printer exist. Consequently the price of this technology has dropped by two orders of magnitude since its creation.

In fused deposition modeling the model or part is produced by extruding small beads of a suitable thermoplastic material (interchangeably termed as only material herein) that hardens immediately to form layers. A thermoplastic filament or metal wire that is wound on a coil is unreeled to supply such material to an extrusion nozzle head (3D printer extruder). The nozzle head heats the material, turns its flow on and off as required and deposits it layer by layer by traversing tool paths provided to it by the gcode file. Typically stepper motors or servo motors are employed to move the extrusion head as required. The printer usually has 3 axes of motion. A computer-aided manufacturing (CAM) software package is used to generate the gcode file as elaborated above that is sent to a microcontroller which controls the various aspects of 3D printing.

FDM printing can utilize a variety of polymers, for example acrylonitrile butadiene styrene (ABS), polycarbonate (PC), polylactic acid (PLA), high-density polyethylene (HDPE), PC/ABS, polyphenylsulfone (PPSU) and high impact polystyrene (HIPS). Fused deposition modeling is also referred to as fused filament fabrication (FFF) by companies who do not hold the original patents like Stratasys does.

A very frequent use of 3D printing is to produce prototypes before starting mass production of a component. However, because of the very nature of FDM technique as elaborated above, which involves forming layer upon layer of thermoplastic material to finally produce a 3D printed part, 3D printed components are not as strong as injection moulded components. Such weak 3D printed parts are not suitable for prototypes with snap fits and components that will be subjected to stress in prototype testing phase.

Strength of 3D printed plastic components is hence a major concern. Attempts have been made to address that with different machines and technologies. One such technique is laser sintering in which a laser is used as a power source to sinter powdered material (typically metal), aiming the laser automatically at points in space defined by a 3D model, binding the material together to create a solid structure. However, this is a very expensive and a relatively new technique.

Another difficulty with present FDM techniques is that of "failed prints". Because of various reasons—mainly clogged extruder nozzles—thermoplastic materials are not deposited properly and/or in quantities required. Hence the component produced does not meet expected standards and is eventually rejected. This leads to a lot of time and material wastage.

Hence there is a need in the art for a system of 3D printing that can print components of increased strength in a reasonably cost effective fashion using proven techniques, and has a system to minimize production of failed prints.

In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

OBJECTS OF THE INVENTION

An object of the present disclosure is to provide a system for 3D printing that eliminates drawbacks of the existing 3D printing systems.

Another object of the present disclosure is to provide a system for 3D printing an object using fusion deposition modeling (FDM).

Another object of the present disclosure provides a system for 3D printing an object using fusion deposition modeling (FDM) that substantially reduces the problem of "failed prints" and so save time, money and efforts.

Another object of the present disclosure provides a system for 3D printing components that have better adhesion between layers and increased overall strength without hampering print quality and overall precision.

Still further object of the present disclosure provides a method of controlling any or a combination of flow of a material being extruded and temperature of the material being extruded in a 3D printer using fusion deposition modeling (FDM).

SUMMARY OF THE INVENTION

The present disclosures generally relates to the field of 3D printing. More particularly, the present disclosures relates to fusion deposition modeling (FDM) and printers using FDM.

In an aspect, the present disclosure provides a system for 3D printing an object using fusion deposition modeling (FDM), the system including: a gcode file read module configured to receive a gcode file and read the contents thereof; a layer features and size recognition module configured to retrieve tool path length from the gcode file; a temperature estimation and control module configured to receive the tool path length from the layer features and size recognition module and further configured to retrieve tool path default temperature of extruder from the gcode file; a material flow deposition estimation and control module configured to read tool path default flow rate of a material to be extruded and the tool path length from the gcode file; and an extrusion failure repair and control module configured to monitor consumption of the material in the 3D printing using fusion deposition modeling (FDM), wherein the system controls any or a combination of flow of the material being extruded and temperature of the material being extruded based on geometry of the object being produced.

In an embodiment, the temperature estimation and control module is further configured to determine a change in temperature ($\Delta t$) required at the extruder in case the tool path length is more than a pre-defined threshold. In an embodiment, the temperature estimation and control module is further configured to implement temperature increment to odd layers in proportion to the tool path length. In an embodiment, the material flow deposition estimation and control module is further configured to determine a change in flow (Δf) required in case the tool path length is more than a pre-defined threshold. In an embodiment, the material flow deposition estimation and control module is further configured to increase flow rate in case tool path is on an infill print.

In another aspect, the present disclosure relates to a method of controlling any or a combination of flow of a material being extruded and temperature of the material being extruded in a 3D printer using fusion deposition modeling (FDM), the method including the steps of: reading a tool path length from a gcode file; determining if the tool path length is more than a pre-defined threshold; calculating temperature increment, such increment being in proportion to the tool path length if the tool path length is more than the pre-defined threshold; sending information regarding the temperature increment to a PID controller; determining if tool path is on an infill print if the tool path length is more than the pre-defined threshold; increasing flow rate of material to be extruded to maximum using a flow control sub-routine if the tool path is on the infill print; and calculating change in flow required and achieving the required flow using the flow control sub-routine if the tool path length is more than the pre-defined threshold and the tool path is not on the infill print.

DESCRIPTION OF SPECIFIC EMBODIMENTS OF THE INVENTION

Figure 1:
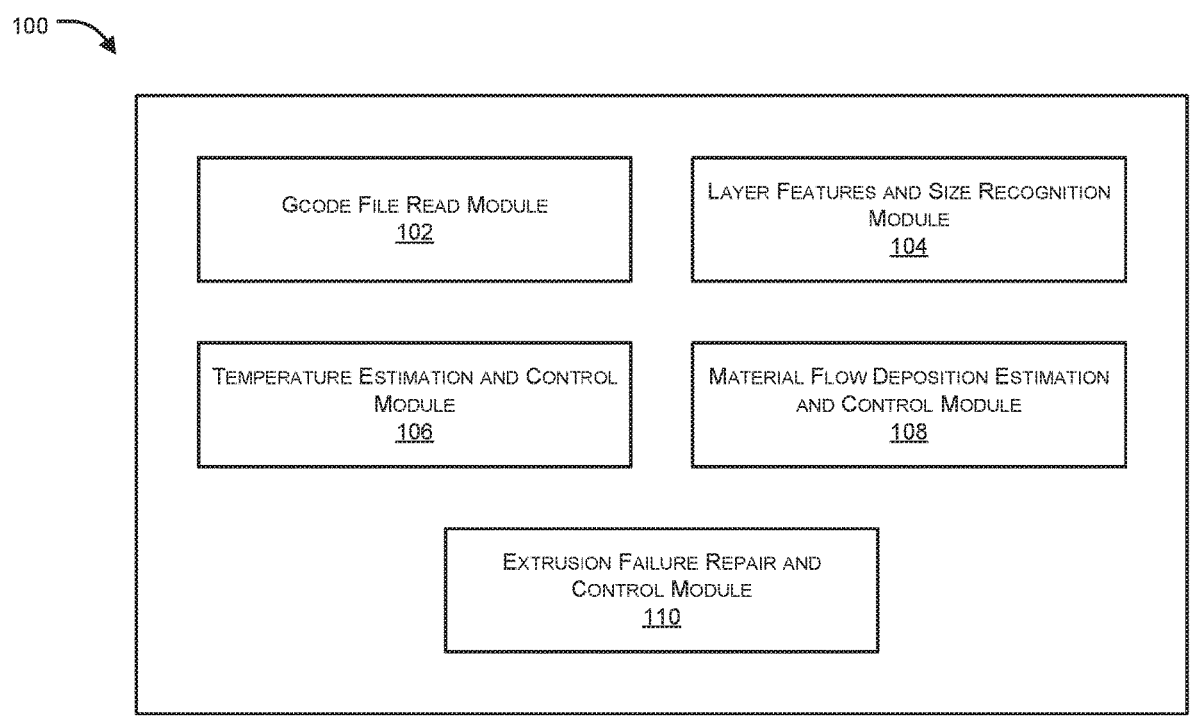
FIG. 1 illustrates exemplary functional modules of the proposed system, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Various terms as used herein are shown below. To the extent a term used in a claim is not defined below, it should be given the broadest definition persons in the pertinent art have given that term as reflected in printed publications and issued patents at the time of filing.

The present disclosures relates to the field of 3D printing. More particularly, the present disclosures relates to a system that uses FDM printers to produce better components in a more cost effective fashion.

In an aspect, proposed system can be operatively connected to an FDM printer and its various components therein so as to receive data from them and control them appropriately as elaborated hereunder.

In an aspect, the present disclosure provides a system for 3D printing an object using fusion deposition modeling (FDM), the system including: a gcode file read module configured to receive a gcode file and read the contents thereof; a layer features and size recognition module configured to retrieve tool path length from the gcode file; a temperature estimation and control module configured to receive the tool path length from the layer features and size recognition module and further configured to retrieve tool path default temperature of extruder from the gcode file; a material flow deposition estimation and control module configured to read tool path default flow rate of a material to be extruded and the tool path length from the gcode file; and an extrusion failure repair and control module configured to monitor consumption of the material in the 3D printing using fusion deposition modeling (FDM), wherein the system controls any or a combination of flow of the material being extruded and temperature of material being extruded based on geometry of the object being produced.

In an embodiment, the temperature estimation and control module is further configured to determine a change in temperature (Δt) required at the extruder in case the tool path length is more than a pre-defined threshold. In an embodiment, the temperature estimation and control module is further configured to implement temperature increment to odd layers in proportion to the tool path length.

In an embodiment, the material flow deposition estimation and control module is further configured to determine a change in flow (Δf) required in case the tool path length is more than a pre-defined threshold. In an embodiment, the material flow deposition estimation and control module is further configured to increase flow rate in case tool path is on an infill print.

In an embodiment, the extrusion failure repair and control module is further configured to detect clogging of extruder nozzles. In an embodiment, the extrusion failure repair and control module is further configured to calculate upper limit and lower limit for consumption of the material.

FIG. 1 illustrates exemplary functional modules of the proposed system, in accordance with an embodiment of the present disclosure.

In an exemplary embodiment, system disclosed can include a gcode file read module 102, a layer features and size recognition module 104, a temperature estimation and control module 106, a material flow deposition estimation and control module 108 and an extrusion failure repair and control module 110. These modules can be operatively configured to perform functions as elaborated hereunder.

Gcode File Read Module 102

In an aspect, gcode file read module 102 can receive a gcode file, read the gcode file and enable other modules to receive information relevant for their functioning from the gcode file, as elaborated herein.

In another aspect, gcode file read module 102 can receive the gcode file directly from a user's computing device or from an FDM printer after it has been provided to the FDM printer to start a 3D printing job.

Layer Features and Size Recognition Module 104

In an aspect, layer features and size recognition module 104 can get from the corresponding gcode file tool path length for current layer (of the part) that needs to be printed and pass this data to temperature estimation and control module 106. As can be appreciated, the tool path length is dependent upon part geometry such as various layer features and their sizes.

Temperature Estimation and Control Module 106

In an aspect, temperature estimation and control module 106 can read the tool path default temperature of the extruder as provided in the gcode file and can get the tool path length from layer features and size recognition module 104.

In another aspect, temperature estimation and control module 106 can calculate change in temperature (delta t or Δt) required at the extruder if the tool path length is more than a pre-defined threshold and send this information to PID (proportional-integral-derivative) controller of the FDM printer for appropriate actions. Depending upon range of default temperature, the change of temperature required can be in a range as well. In an exemplary embodiment, such range can be 15-25 degrees C.

In an exemplary embodiment, temperature estimation and control module 106 can be configured in such a fashion that if the tool path length is more than a pre-defined threshold, the temperature increment can be applied to odd layers in proportion to tool path length. It can be appreciated that if the tool path length is more, temperature at extruder should be more, and vice versa.

The PID controller can in turn check the actual temperature as against what is required and send out appropriate PWM (pulse-width modulation) signals to extruder heater configured in the FDM printer.

In an exemplary embodiment, system proposed can print a first layer according to the default temperature as provided in the gcode file. For the next layer, it can apply a temperature increment as elaborated above. The subsequent layer can be again at the default temperature, and the next one can again have same temperature increment, and so on. In this fashion, a layer can be sufficiently cooled per parameters in the gcode file before the next layer is applied and so, shape deformation can be avoided.

Material Flow Deposition Estimation and Control Module 108

In an aspect, material flow deposition estimation and control module 108 can read the tool path length from the gcode file for the current layer that the FDM printer needs to print.

In another aspect, material flow deposition estimation and control module 108 can determine from the gcode file the tool path default flow rate of the thermoplastic material to be extruded.

In another aspect, material flow deposition estimation and control module 108 can calculate change in flow required (delta f or Δf) based on tool path length and can give appropriate instructions to flow control subroutine of the FDM printer (machine) for achieving the required flow. The flow control routine can accordingly calculate flows and extruder movement.

Module 108 can be configured in such a fashion that if the tool path length is more than a pre-defined threshold, material flow deposition estimation and control module 108 can check if the tool path is on an infill print—(printing an interior part of component) and then can increases flow rate up to maximum defined level as can be had from the gcode file for better bonding.

Extrusion Failure Repair and Control Module 110

In an aspect, module 110 can help minimize the problem of "failed prints" wherein because of problems such as clogged extruder nozzles the print can fail subsequent quality and strength tests.

In an aspect, extrusion failure repair and control module 110 can read the tool path length as provided in the gcode file for current layer. In an exemplary embodiment, extrusion failure repair and control module 110 can read the extrusion length of a current print line as well, wherein the summation of such print lines can lead to the print layer.

In another aspect, extrusion failure repair and control module 110 can calculate the upper and lower limits of material consumption and continuously monitor amount of material actually consumed by the FDM printer based on pre-defined pulses from filament encoder per mm of layer being formed.

In yet another aspect, if the amount of material being consumed is lesser than the lower limit as calculated above, module 110 can slow down the extruder motor by a pre-defined factor until amount of material consumed matches the machine calculated value. If still material consumed remains lesser, after a pre-defined number of such healing attempts, module 110 can take extrusion head to safe zone, display an error message and wait for user input. User can accordingly check printer status and take measures to rectify the error.

In an exemplary embodiment, extrusion failure repair and control module 110 can print a layer, determine the amount of material (filament) actually consumed for such printing and compare that with the lower limit of material consumption calculated by it. In case the actual consumption is lower than the lower limit, proposed system can conclude that the printer extruder nozzle has clogged. Accordingly module 110 can generate a signal for the extruder motor, lowering its speed. In an exemplary embodiment, speed can be halved. Next, module 110 can run the printer at such speed for next 30 minutes, and then speed up the extruder motor to its full speed and again monitor the consumption as before. In the event the extruder nozzle has been cleaned by the material being extruded, the actual consumption can be higher than the lower calculated value in which case, module 110 can enable the printer to complete the print job, else make further attempts to heal the system.

In this fashion, proposed system can substantially reduce the problem of "failed prints" and so save time, money and efforts.

As elaborated above, proposed system can vary any or a combination of temperature and flow of thermoplastic material being used for extruding by an FDM printer based upon geometry of part being produced, whereas existing 3D FDM Printers use constant temperature and material flow across the geometry of the part. Consequently, component produced by using proposed system have better adhesion between layers and increased overall component strength without hampering print quality and overall component precision. Further, proposed system can substantially reduce the problem of "failed prints" and so save time, money and efforts.

In another aspect, the present disclosure relates to a method of controlling any or a combination of flow of a material being extruded and temperature of the material being extruded in a 3D printer using fusion deposition modeling (FDM), the method including the steps of: reading a tool path length from a gcode file; determining if the tool path length is more than a pre-defined threshold; calculating temperature increment, such increment being in proportion to the tool path length if the tool path length is more than the pre-defined threshold; sending information regarding the temperature increment to a PID controller; determining if tool path is on an infill print if the tool path length is more than the pre-defined threshold; increasing flow rate of material to be extruded to maximum using a flow control sub-routine if the tool path is on the infill print; and calculating change in flow required and achieving the required flow using the flow control sub-routine if the tool path length is more than the pre-defined threshold and the tool path is not on the infill print.

Figure 2:
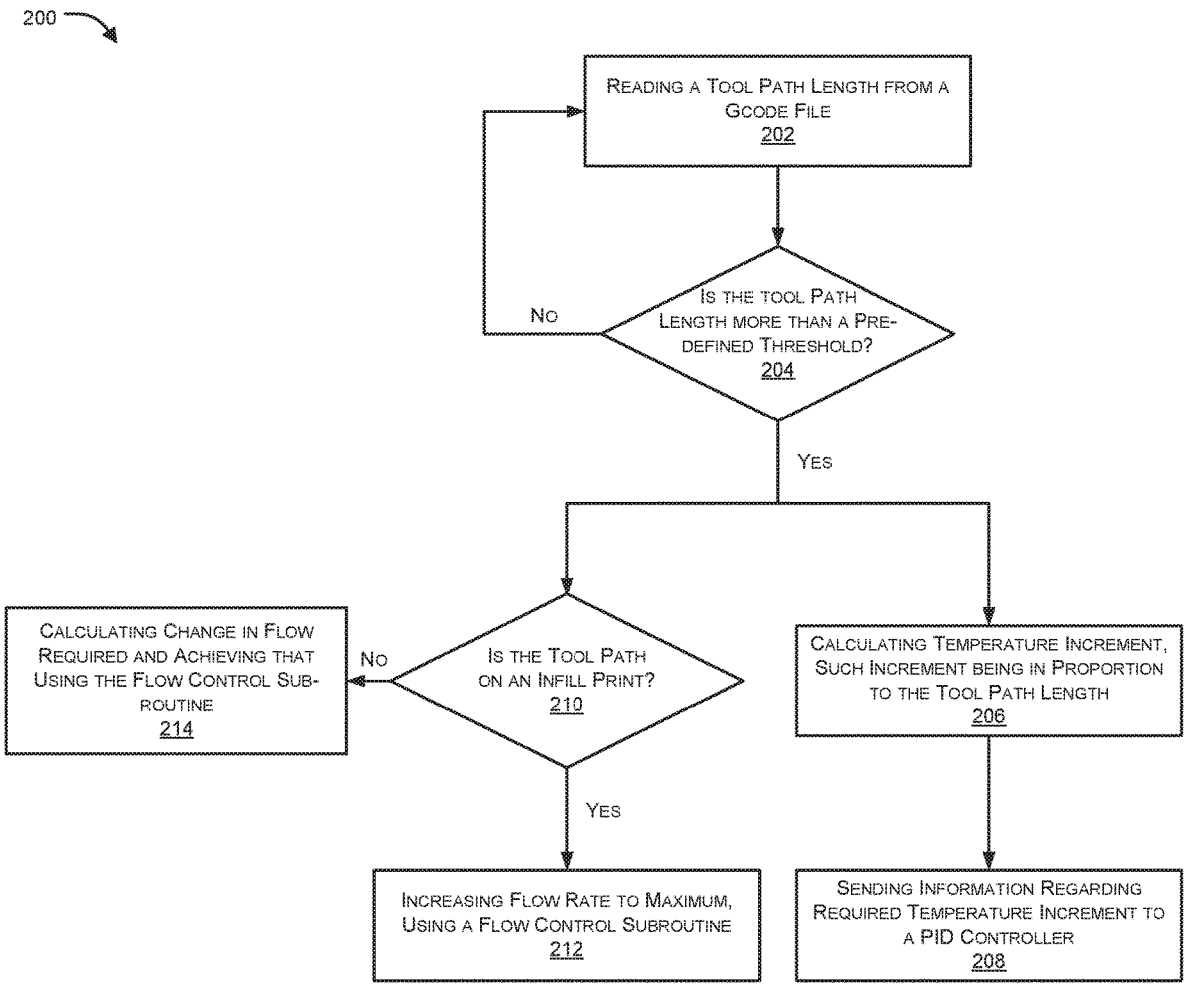
FIG. 2 illustrates, by means of a flow chart, method of working of the proposed system, in accordance with an exemplary embodiment of the present disclosure.

FIG. 2 illustrates, by means of a flow chart, a method of working of the proposed system, in accordance with an exemplary embodiment of the present disclosure.

In an aspect, method disclosed can include, at step 202, reading a tool path length from a gcode file.

In another aspect, method disclosed can include, at step 204, determining if the tool path length is more than a pre-defined threshold.

In yet another aspect, method disclosed can include, at step 206, calculating temperature increment, such increment being in proportion to the tool path length, if the tool path length is more than a pre-defined threshold.

In an aspect, method disclosed can include, at step 208, sending information regarding required temperature increment to a PID controller.

In another aspect, method disclosed can include, at step 210, determining if the tool path is on an infill print, if the tool path length is more than a pre-defined threshold.

In yet another aspect, method disclosed can include, at step 212, increasing flow rate (of extruded material) to maximum, using a flow control subroutine, if the tool path is on the infill print.

In an aspect, method disclosed can include, at step 214, calculating change in flow required and achieving that using the flow control sub-routine, if the tool path is not on an infill print and the tool path length is more than a pre-defined threshold.

Figure 3A:
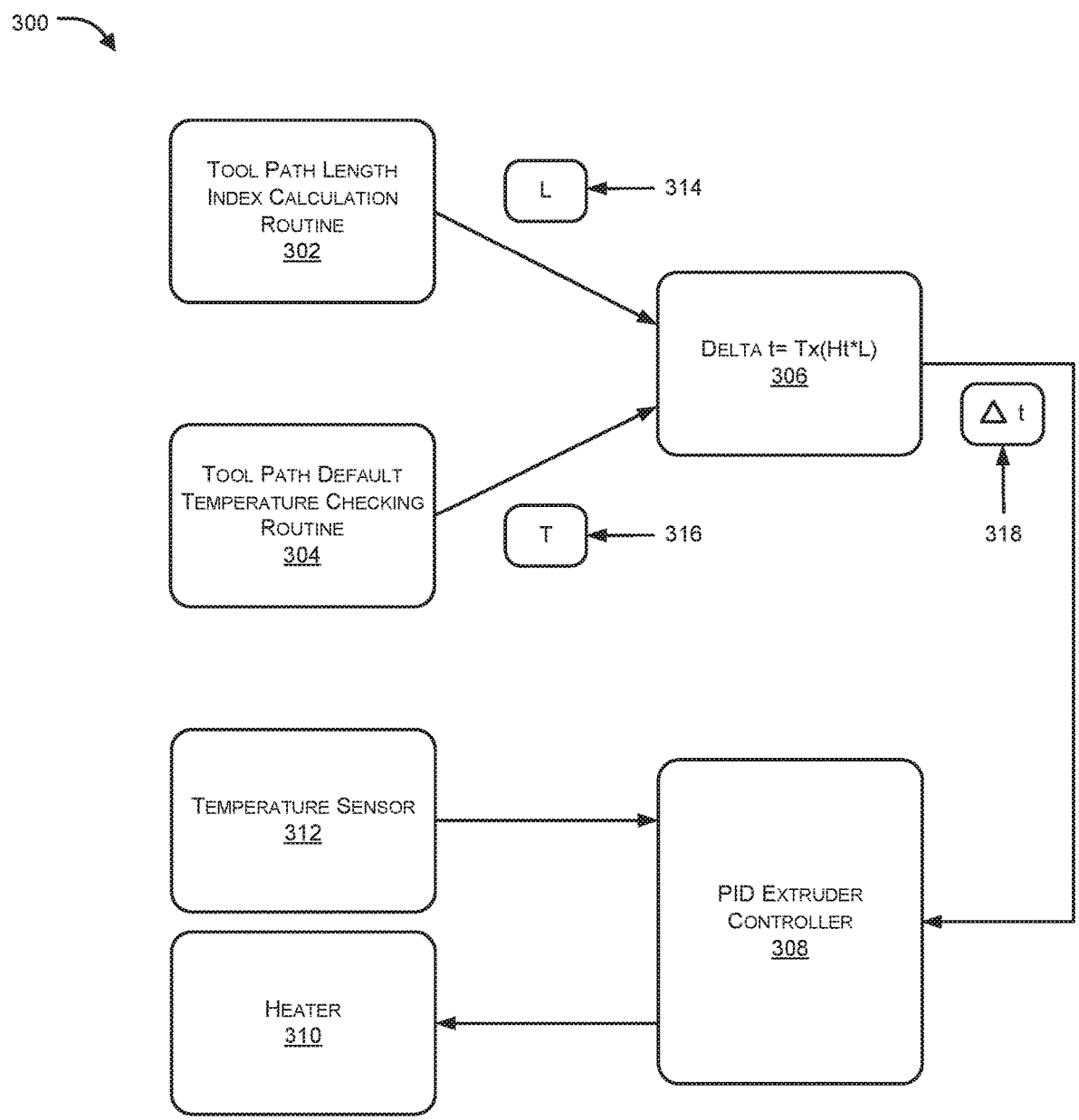
FIGS. 3A, 3B and 3C illustrate working of various aspects of the proposed system, in accordance with an exemplary embodiment of the present disclosure.
Figure 3B:
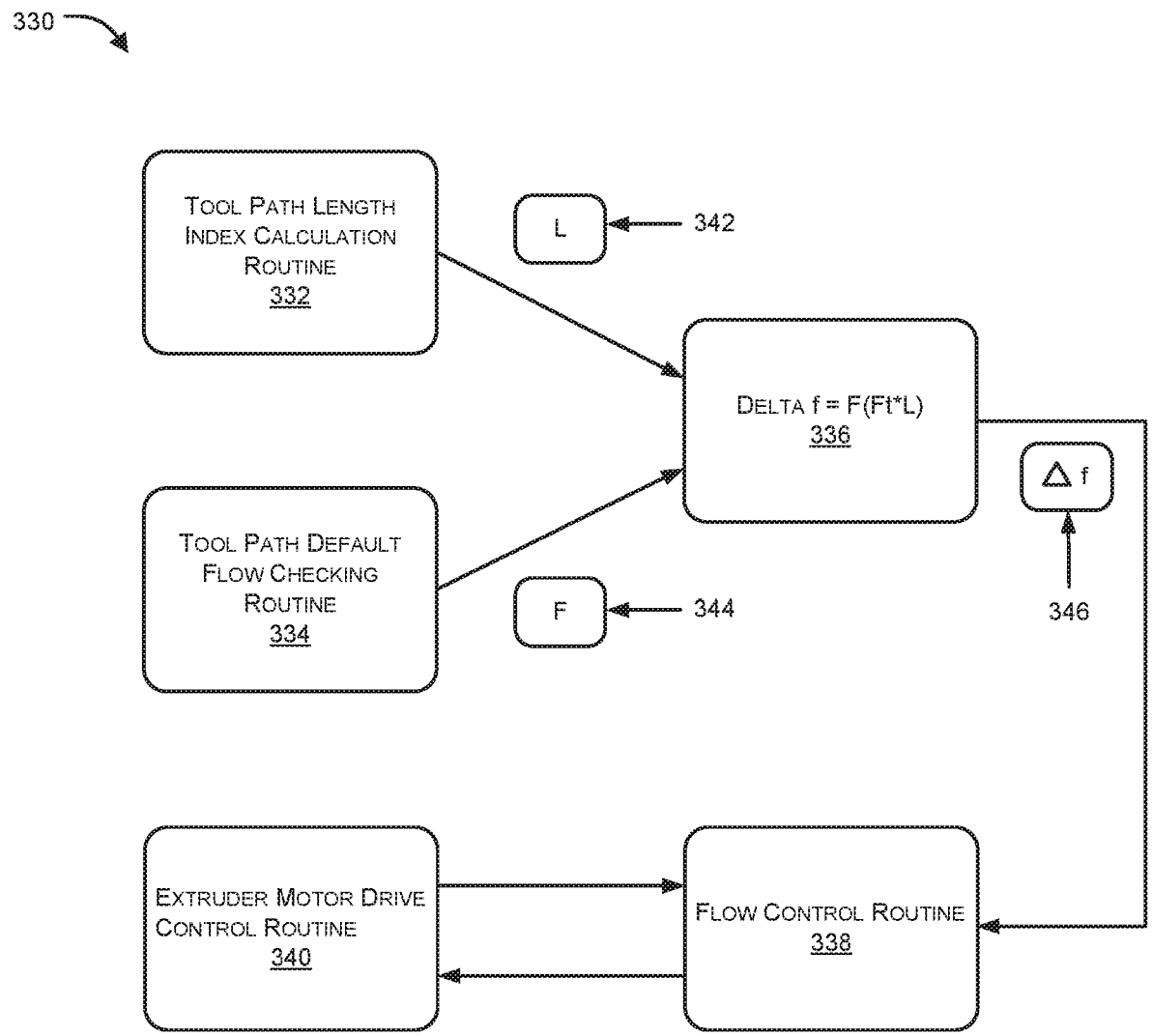
Figure 3C:
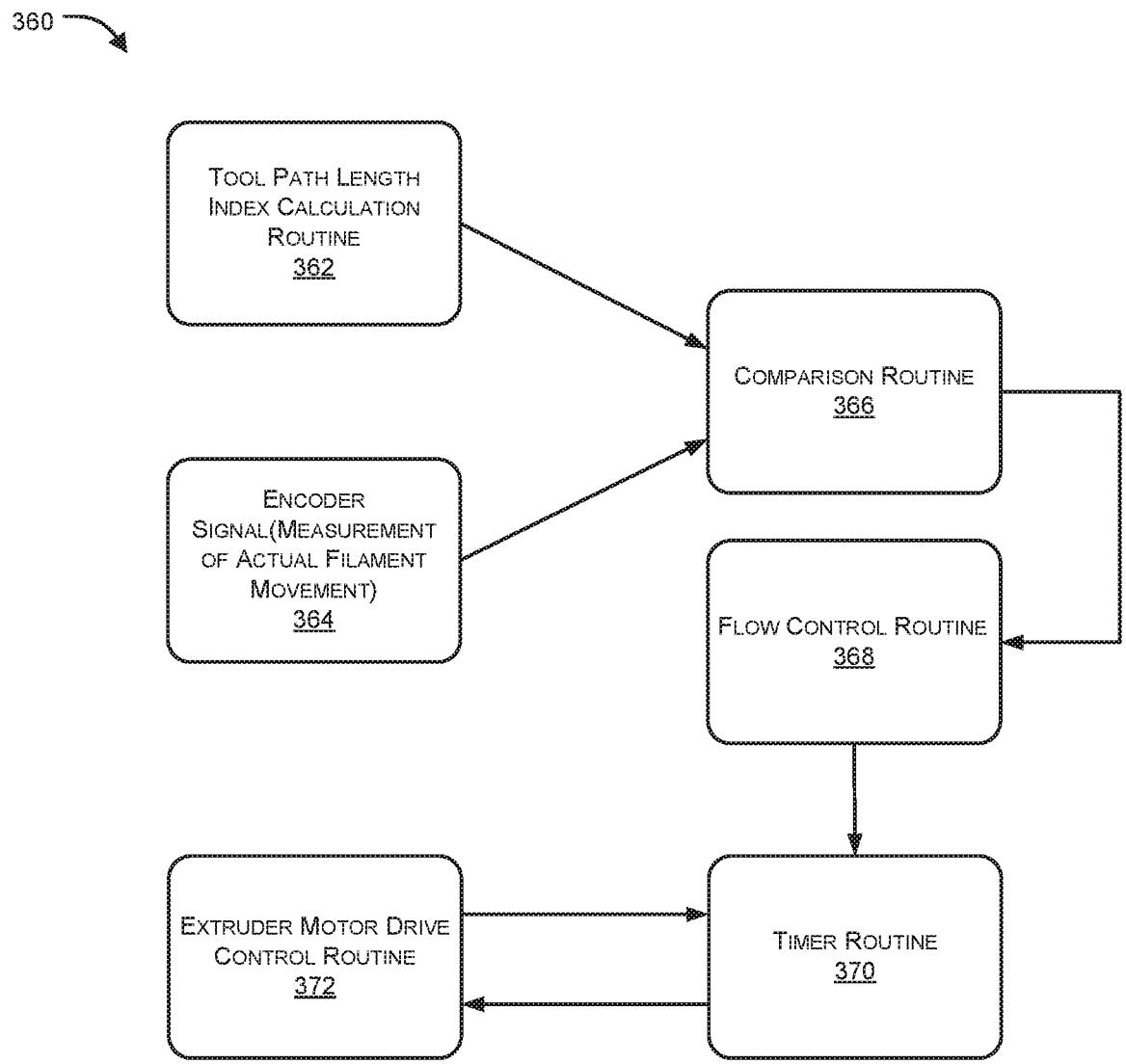

FIGS. 3A, 3B and 3C illustrate working of various aspects of the proposed system, in accordance with an exemplary embodiment of the present disclosure.

In an exemplary embodiment, as illustrated in FIG. 3A, proposed system can include a feature size estimation and temperature control sub-system that can get a tool path length L index 314 from a Tool Path Length Index Calculation Routine 302, wherein an index 100 represents a default tool path length as configured in a gcode file; and default extruder temperature T 316 from a Tool Path Default Temperature Checking Routine 304 of the gcode file. Accordingly the sub-system can determine Delta t 318 ($\Delta t$), wherein Delta t can be a function of temperature T, indexed tool path length L and Ht, wherein Ht can be the pre-defined temperature for the default tool path length as configured in the gcode file.

In an exemplary embodiment, Delta t can be equal to Tx(Ht*L), as illustrated at 306.

The proposed sub-system can send this Delta t 318 information to a PID Extruder Controller 308 that can in turn receive input from a temperature sensor 312 and can send control output accordingly to a heater 310.

In another exemplary embodiment, as illustrated in FIG. 3B, proposed system can include a material flow deposition and estimation sub-system that can get a tool path length L index 342 from a Tool Path Length Index Calculation Routine 332, wherein an index 100 represents a default tool path length as configured in a gcode file and default extruder flow F 344 from a Tool Path Default Flow Checking Routine 334 of the gcode file and accordingly determine Delta f 346 ($\Delta f$), wherein Delta f 346 can be a function of flow F, indexed tool path length L and Ft, wherein Ft can be the pre-defined flow for the default tool path length as configured in the gcode file.

In an exemplary embodiment, Delta f can be equal to Fx(Ft*L), as illustrated at 336.

The proposed sub-system can send this Delta f information to a flow control routine of the printer 338 that can in turn drive the extruder motor drive control routine 340.

In yet another exemplary embodiment, as illustrated in FIG. 3C, proposed system can include can an extrusion failure repair and control sub-system with a comparison routine 366 that can compare data from a Tool Path Length Index Calculation routine 362 and an Encoder Signal 364 (that measures actual filament movement). Based upon such comparison, the comparison routine 366 can control a flow control routine 368 that can in turn drive a timer routine 370 that in turn operatively communicates with an extruder motor drive control routine 372.

In this fashion, proposed system controls flow and temperature of material being extruded on the basis of geometry of part being produced whereas existing 3D printers use constant temperature and flow to melt and deposit material and build a part layer by layer.

Consequently, proposed system produces a part with better adhesion between layers being printed leading to overall component strength without hampering print quality and overall component precision.

Proposed system uses readily available FDM printers and technologies and so can be much more competitive than those using advanced technologies like laser sintering for similar purposes.

In addition, proposed system can substantially reduce the problem of "failed prints" and so save time, money and efforts.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES

The present disclosure provides a system for 3D printing that eliminates drawbacks of the existing 3D printing systems.

The present disclosure provides a system for 3D printing an object using fusion deposition modeling (FDM).

The present disclosure provides a system for 3D printing an object using fusion deposition modeling (FDM) that substantially reduces the problem of "failed prints" and so save time, money and efforts.

The present disclosure provides a system for 3D printing components that have better adhesion between layers and increased overall strength without hampering print quality and overall precision.

The present disclosure provides a method of controlling any or a combination of flow of a material being extruded and temperature of the material being extruded in a 3D printer using fusion deposition modeling (FDM).

What is claimed is:

1. A method of controlling any or a combination of flow of a material being extruded and temperature of the material being extruded in a 3D printer using fusion deposition modeling (FDM), the method including the steps of:
    reading a tool path length from a gcode file;
    determining if the tool path length is more than a pre-defined threshold;
    retrieving a tool path default temperature of an extruder of the 3D printer from the gcode file;
    determining a change in temperature ($\Delta t$) of the extruder relative to the tool path default temperature and based on the tool path length in a case where the tool path length is more than the pre-defined threshold;

controlling the temperature of the material being extruded based on the change in temperature ($\Delta t$) by sending information regarding the change in temperature ($\Delta t$) to a PID (proportional-integral-derivative) controller;

reading a tool path default flow rate of a material to be extruded from the gcode file;

determining if the tool path is on an infill print if the tool path length is more than the pre-defined threshold;

increasing the flow rate of material to be extruded to a maximum flow rate using a flow control subroutine if the tool path is on the infill print; and calculating a change in flow rate required relative to the tool path default flow rate and achieving the required flow rate using the flow control sub-routine if the tool path length is more than the pre-defined threshold and the tool path is not on the infill print.

* * * * *